United States Patent [19]
Wisbey

[11] 4,043,486
[45] Aug. 23, 1977

[54] MIXING APPARATUS

[75] Inventor: Jerry Dale Wisbey, Cincinnati, Ohio

[73] Assignee: Cincinnati Milacron Inc., Cincinnati, Ohio

[21] Appl. No.: 654,291

[22] Filed: Feb. 2, 1976

[51] Int. Cl.² .................................................. B67D 5/60
[52] U.S. Cl. ................................... 222/134; 222/148; 259/4 R; 222/318
[58] Field of Search .................. 222/134, 148, 318; 259/4, 36; 425/4 R, 130, 206; 137/604, 609; 239/114–117, 123

[56] References Cited

U.S. PATENT DOCUMENTS

| | | | |
|---|---|---|---|
| 3,786,990 | 1/1974 | Hagfors | 239/117 |
| 3,913,892 | 10/1975 | Ersfeld et al. | 259/4 R |

*Primary Examiner*—Allen N. Knowles
*Attorney, Agent, or Firm*—Daniel P. Worth

[57] ABSTRACT

A mixing and dispensing apparatus for liquids that react chemically with each other from plural independent sources mixes same, and then cleans itself by injecting a terminal portion thereof into a mold. The mixing and dispensing means is intended to be incorporated into a system that provides measured quantities of the respective liquids, has control valving external of the mixing and dispensing means of the invention, and can recirculate the respective liquids except during actual mixing and dispensing. The mixing and dispensing apparatus has porting and passageways in its housing to permit recirculation and has a plunger which can be adjusted in its stroke to cover or uncover a certain amount of the mixing ports through which the respective liquids flow into the mixing chamber thence into the mold cavity. A stroke of the plunger sweeps the terminal portion of the reacting liquid mixture out of the mixing chamber, forcing it into a mold, thus cleaning the mixing chamber and packing the mixture in the mold cavity.

16 Claims, 6 Drawing Figures

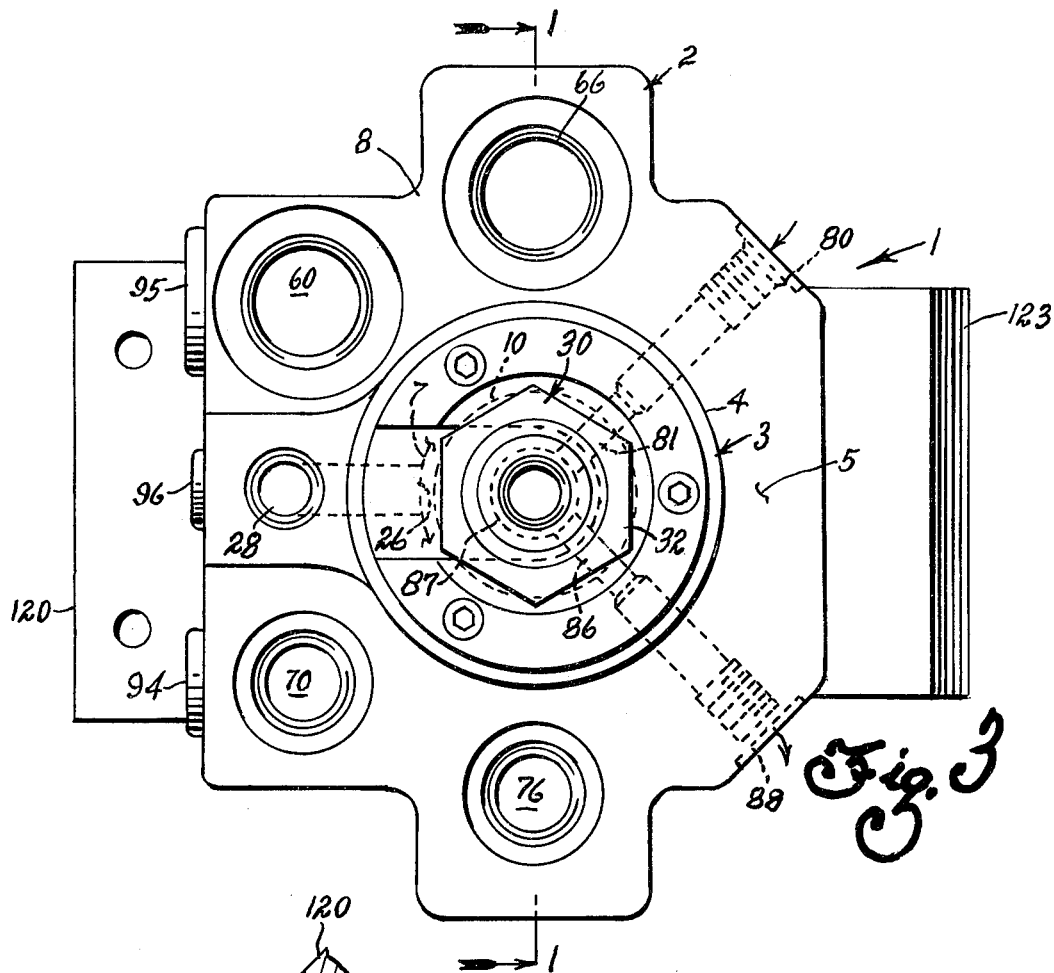
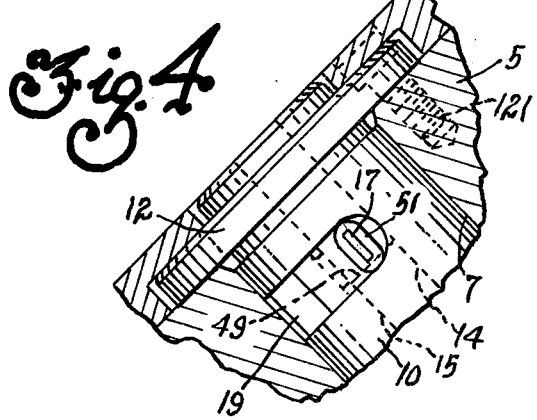
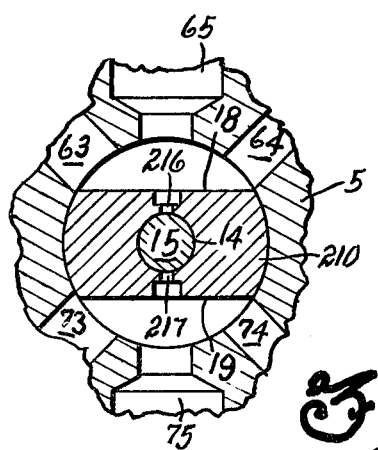
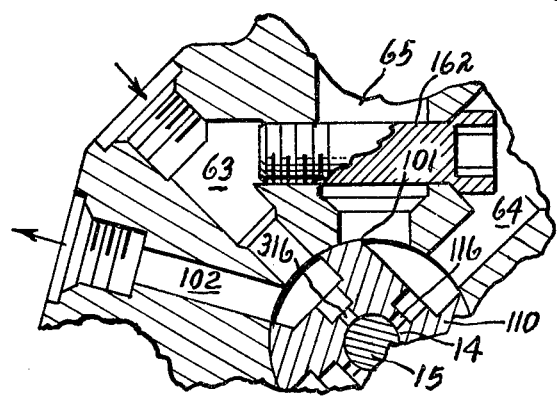

MIXING APPARATUS

SUMMARY AND BACKGROUND OF INVENTION

The present invention relates to an improved fluid mixing apparatus. An aspect relates to dispensing apparatus. One aspect relates to improvements in mixing and dispensing apparatus that derives the fluids passing therethrough from plural independent sources. An aspect also relates to an apparatus for mixing and dispensing chemically reacting liquids derived from plural sources such as the polyol and isocyanate which are reactable to form a thermoset polyurethane in connection with which by way of example but not limitation the invention will be described.

Reference is here made to U.S. Pat. No. 3,912,234 by John W. Peter which illustrates a system for mixing reacting liquids of the sort here contemplated. In that patent is described a mixing head. The present invention constitutes an improvement over the mixing head there described and is intended for a similar, indeed identical, application.

The present invention is more readily manufactured than its predecessor, provides an improved mode of adjustment to permit changing the volume of mixed fluids to be dispensed and other advantages and features.

More particularly this invention concerns apparatus for mixing a plurality of liquids, directing the mixture into another device (probably a mold), and then cleaning the apparatus with a plunger by forcing the remaining mixture into a chamber downstream thereof comprising: a housing having walls; a mixing chamber surrounded by the walls; an elongated plunger slidably fitted in said mixing chamber and peripherally engaging the continuous walls of the mixing chamber; a drive means for reciprocating the plunger supported on said housing and including therein a driving fluid chamber substantially coaxial with the plunger axis, a drive piston having faces on its ends reciprocably fitted within the chamber and secured to one end of said plunger, said fluid port means for communicating to the driving fluid chamber to admit and remove driving fluid to at least one face of the piston; stroke adjusting means mounted on the drive means for adjusting the piston stroke hence to adjust the stroke of said plunger; first and second ports which are preferably rectangular slots in the mixing chamber wall opening directly into the mixing chamber from respective positions opposite each other; first and second passageways for fluid through the housing walls and connected, respectively, to the first and second ports; said stroke adjusting means being adjustable to move said plunger sufficiently to block and to unblock by a preselected amount said ports; and the piston being disposed between the mixing chamber and the adjusting means the three of which are substantially coaxial with said plunger. A removable sleeve construction within the housing preferably defines the mixing chamber.

Other objects, advantages and features will become apparent from a reading of the following more detailed description together with the attached drawings wherein:

FIG. 1 is a side section view on section 1—1 of FIG. 3 of a mixing and dispensing head according to the invention schematically showing in addition certain conduits and external valving into which the head is preferably to be connected and using the same reference numbers for the conduits and external valving as were employed in U.S. Pat. No. 3,912,234;

FIG. 3 is a top view of FIG. 1, i.e., a view from the right of the FIG. 1 head;

FIG. 4 is a partial section view along 4—4 of FIG. 2 showing the longitudinally extending rectangular parts preferably used in the sleeve;

FIG. 5 is a partial section view taken along the central part of section 2—2 of FIG. 1 showing a modification employing a two port sleeve other parts remaining the same; and FIG. 6 is another modification as also seen along the central part of section 2—2.

Figure 1:
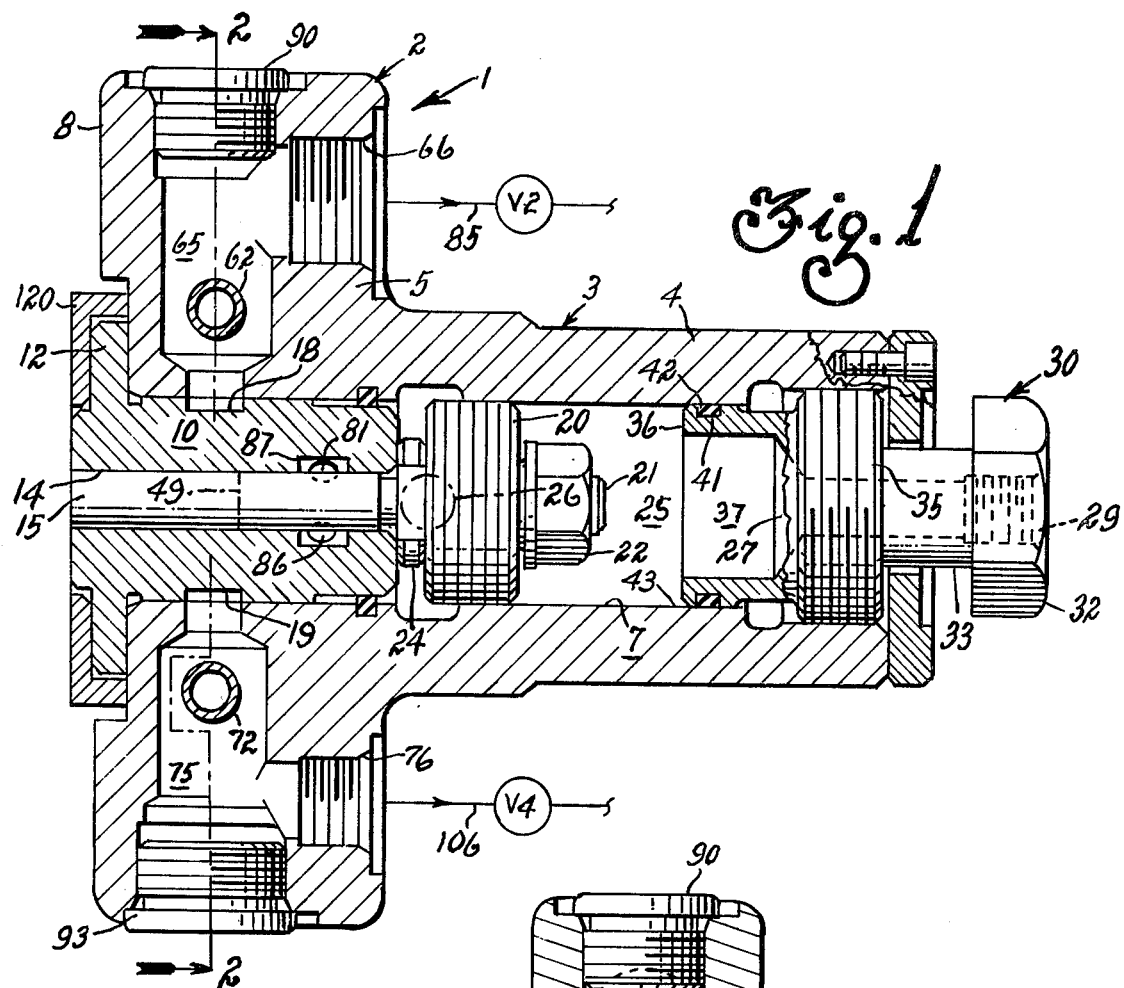

Referring now to all the drawings, but most particularly to FIGS. 1-4 there is shown an apparatus according to the invention for mixing a plurality of liquids and for dispensing the resulting mixture into a mold cavity or similar chamber downstream of the apparatus. The apparatus 1 includes a housing 2 which is shaped sort of like a flanged tube and preferably is machined from a one piece casting. The tubular portion 3 provides walls 4,5, that surround a number of chambers which constitute operating parts of the invention. The tubular or walled part of the housing has a mounting bore 7 therethrough along which these chambers are defined. The housing flange 8 contains the several fluid flow passages and has connecting means (e.g. threads) for connecting to supply and return conduits as presently described.

Within the housing bore 7 is secured an insert or a sleeve 10 which preferably is also shaped like a flanged tubular member. The sleeve 10 has a flange 12 at one end to enable positive location of the sleeve relative to the housing. The sleeve has a bore 14 completely therethrough within which is slidably fitted an elongated plunger 15 that is reciprocated back and forth within the bore. It is this sleeve bore 14 which constitutes the mixing chamber. The plunger 15 admits to and cuts off the flow of fluids from the mixing chamber through the ports 16,17. The ports are preferably rectangular as taught in Peter's patent supra. The bore 14 is substantially cleaned by moving plunger 15 to cover the ports 16,17 (thus stopping the inflow of fluid) to push the terminal portion of reagents and reacting products out of the chamber before they can react to a solid state. The outside of the sleeve 10 is undercut at 18,19 (FIGS. 2,4) in the immediate regions of the ports to provide in cooperation with the housing bore 7 a convenient manifold means for the flow of fluid to these ports.

A piston 20 is secured to one end 21 of the plunger by a nut 22 and is located axially on the plunger by a shoulder 24. The piston 20 and a cooperating power chamber 25 within the housing bore form part of a drive means to reciprocate the plunger 15. The driving fluid chamber 25 within which the piston is located is substantially coaxial with the plunger as is the drive piston.

Fluid port means 28,29 are formed through the housing wall to provide driving fluid to at least one side of the piston 20. Significantly, the liquids emerge directly into the power chamber 25 from the ports 28,29. In the preferred embodiment, the piston 20 is double acting and hydraulically operated wherefore are provided ports 26,27 (26 shown dotted FIG. 3 and in phantom FIG. 1 to illustrate in latter its relative position) into the driving chamber and fluid passageways 28,29 feeding into said ports.

At the end of the tubular portion of the housing opposite the plunger location is a stroke adjusting means 30 for adjusting the stroke of the piston and therefore of the plunger. This is constructed in a fashion similar to a rising valve stem and has a handle 32 (FIGS. 1,3) shown here as a hexagonal element secured on one end of a hollow threaded shaft 33. The shaft is hollow, having the longitudinal passageway 29 completely therethrough in order to provide entrance and exit means for hydraulic liquid against or from one face of the piston. Intermediate the ends of the shaft is secured a threaded portion 35 of large diameter. The threads engage the housing and turning the shaft can advance or retract the stop or inside end 36 of the stem thereby to determine the end position which the piston can assume when it is fully withdrawn, i.e. drawn fully to the right as shown in dotted lines in FIG. 1. The inside end 36 of the shaft is a piston stop comprising an annular section the hollowed out central portion 37 of which receives the retaining nut 22 when the piston is fully withdrawn as well as permitting the flow of hydraulic liquid in and out of that end of the drive chamber.

On the outer portion of this annulus are formed seal means, preferably a groove 41 to the end for retaining a seal 42 therein, which seal cooperates with an adjacent internal portion of the housing wall 43 to achieve its sealing function.

Figure 2:
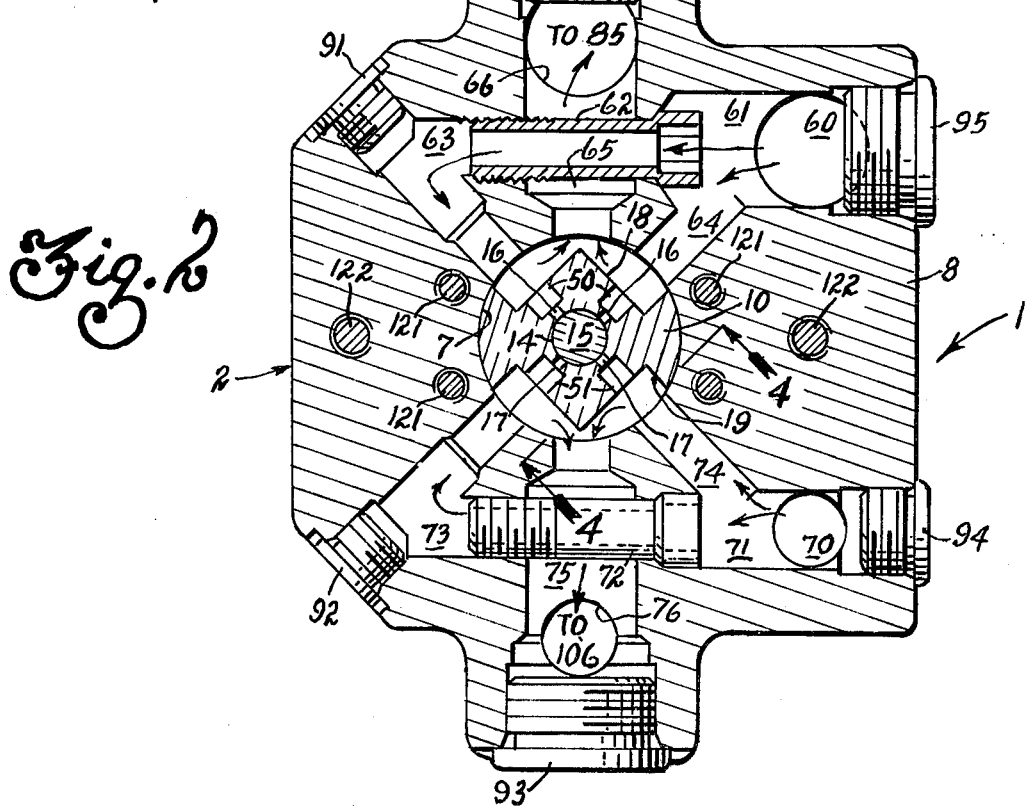
FIG. 2 is a bottom section view along 2—2 of FIG. 1.

The ports 16,17 through the sleeve wall are preferably rectangular and have a longitudinal dimension extending parallelly with the axis of the plunger. They are slots. The rectangular shape is preferred because —it provides a linear characteristic of adjustment of the plunger to cover ports 16,17; it provides more surface area to the liquid jet; it induces more turbulence; hence mixing is enhanced. The ports and the plunger length are such that the plunger 15 when fully withdrawn to the right (FIGS. 1,4 dotted line 49) can uncover all (or any desired fraction if partially withdrawn) on the longitudinally extending rectangular ports 16,17. In this manner advancement of the plunger to the left (FIG. 1 solid lines) during an operational cycle will ultimately close the ports. As illustrated in FIGS. 2 and 4, ports can be arranged to spray their respective liquids directly into a stream entering from a port on the diametrally opposite side of the chamber. Alternatively, an offset arrangement of ports may be provided to achieve a whirling action of liquid.

In the preferred embodiment (FIGS. 2,4) where multiple ports are required for one of the liquids, adjacent ports connected to a common manifold means and supply means are provided as shown for adjacent multiple ports 16,16 and their manifold 18 (e.g. for polyol) and adjacent multiple ports 17,17 and manifold 19 (for e.g. isocyanate). Machining of the slots or slits for the ports is simplified by endmilling the undercuts/manifolds 18,19 in the regions of the respective ports upstream thereof, and part of the way through the sleeve wall as at 50,51 respectively.

The construction and arrangement of the sleeve 10 to provide rectangular ports 16,17 in the mixing chamber wall 14; adjacent ports and manifolding 18,19,50,51 for the same liquid (FIGS. 1-5), removable and interchangeable sleeves for changing port arrangements (e.g. port size, shape, and numbers—(compare FIGS. 1-4 and FIGS. 5,6) has a number of advantages over other structures in this art, viz: simple and less expensive construction; as small a plunger is desired due to non-use of seals thereon hence better mixing due to closeness of ports resulting from a smaller chamber; positioning of the orifice 16,17 (i.e. maximum restriction) directly in the chamber wall, theoretically putting in the mixing chamber the vena contracta of the stream to enhance the turbulence and the mixing action; simultaneous adjustment of the orifices by the positioning of the plunger (viz. between the solid and dotted lines at 15 and 49 FIGS. 1,4); and recirculation via the manifolding 18,19 (and external conduits and valves e.g. V2,V4) without flow through the ports 16,17 thus allowing some fillers (e.g. fibers) to be present in at least one liquid and minimizing pressure drop.

A "hydraulic fit" is used between the plunger 15 and the sleeve bore 14, i.e. the fit and the diametral clearance and shop tolerances are such that there is almost a metal-to-metal fit so that the amount of liquid or reagent able to flow past the plunger is nil. On a ¼ inch diameter bore 14 both the bore tolerance and the bore diametral clearance are not more than about plus five ten-thousandths of an inch (0.0005 inches). The plunger is selectively sized and ground or otherwise finished to match the bore.

Passages are formed in the housing for the flow of various fluids. Where possible, the passages are formed by drilling or boring along a straight line to intersect other passages along which the flow path is to be. FIGS. 1-3 illustrate this most clearly. One fluid e.g. polyol enters the apparatus 1 by conduits (not shown) connected to a threaded (tapped) hole 60 formed in the flange 8 along an axis parallel to that of the plunger 15. Liquid entering at this point makes a right angle turn and enters a first passage segment 61 which has been formed in the housing by drilling or boring and by screwing into place a hollow threaded insert 62, the purpose of which is to keep the incoming and exiting liquids separate. Upon entering passage segment 61 the incoming liquid splits into two streams, one of which goes through the hollow portion of the threaded insert 62 and then enters another segment 63. The other stream enters a similar segment 64. Both streams after traversing the second segment are than in the manifold region 18 where they are in contact with the ports 16 formed in the sleeve 10. However, no fluid can flow through those ports unless the plunger 15 has been moved to the right sufficiently to uncover the ports and permit flow into the mixing chamber.

For present purposes the term "mixing chamber" alludes to the volume within bore 14 resulting from displacement of plunger 15 so that piston 20 engages shoulder 36 on the stroke adjuster 30. That is, the mixing chamber is the bore volume to the left of the plunger dotted line 49 as viewed in FIGS. 1 and 4.

It will be appreciated that the plunger 15 functions are to act as an on-off valve member to simultaneously permit different liquids to flow vel non and to remove as completely as possible reagents from the mixing chamber to minimize their solidifying and stopping operation. Operating experience has indicated, however, that a very thin film of reaction product often forms between the plunger 15 and bore 14: it is such that the breakaway force applied to the plunger is high, but continued operation is not prevented. The volume displaced by the plunger is normally not the shot volume. The shot volume is determined by the length of time the plunger is held to the right (FIGS. 1,4) and the quantities of material fed by metering means such as meter pumps 7,9 of Peter's patent supra.

If the plunger 15 covers the ports 16,17 (solid lines FIGS. 1,4) then the fluid is caused to recirculate, whereby it leaves the manifold region 18 (using, e.g., the flow entering at 60) and passes out of the housing by going through a main passage 65 around the outside of insert 62 then making a right angle turn into threaded exit port 66 thence into conduit 85 to valve V2 (references 85 and V2 are the same numbers as in Peter's patent supra). The conduit 85 is secured in the threaded exit 66 that is formed parallelly to the plunger.

A similar sequence of passages 70,71,73,74,75 hollow threaded insert 72, manifold region 19, and tapped entry and exit ports 70,76 is provided for the other liquid which is to be directed into the mixing chamber. The exiting liquid leaves by conduit 106 and travels thence to valve V4 (reference numbers as in Peter's supra).

The plunger is cleaned and/or lubricated by a solvent (di-octyl-phthalate) that is circulated through the housing and an upper portion of the bore 14 in such a manner that it contacts the upper (or right FIG. 1) end of the plunger 15. The solvent or cleaning liquid enters the housing at a tapped hole 80 (from a supply) passage formed completely through the flange 8 and through a communicating hole 81 in the sleeve to a groove 87 located between the sleeve ports 16,17 and the shoulder 24 or drive end of the plunger. The liquid leaves the groove 87 by means of a passageway 86 formed in the sleeve wall and then through an exit passage 88 formed in the housing flange which has a thread or other means at its terminus for connecting to a suitable solvent return system.

Plugs 90,91 . . . 96 etc. are threadedly secured in the unused end of various passages in order to seal them. Many of these passages may provide an alternative and/or supplemental entry or exit to those already described (FIG. 6). Thus, there can be added at the mixhead a stream of e.g. blowing agent, colorants, catalysts, other reagents, and/or other parts of the formulation. FIG. 6 by way of example shows how to form a seal 101 on the interchangeable sleeve 110, to bore a passage 102 in the otherwise standard housing 2, and to use a solid insert 162—other parts keeping their same numbers—so that a third stream from passage 63 can be added through the port numbered 316 and recirculate via 102. Passages 64,65 and port 116 define a recirculation path and mixing chamber port, respectively, for the second liquid.

The mixing head 1 is secured to one part of a mold by means of a longitudinally extending bracket 120 that has a shallow channel cross-section (FIG. 1) and which is in turn secured to housing 2 by bolts 122 in the manner best shown in FIG. 2. Note that the sleeve 10 is secured removably in the apparatus bore 7 by a plurality of bolts 121. Because the mixing head 1 is ordinarily situated on the parting line of a mold and secured to only one part of the mold by the bracket 120 it is desired to facilitate the alignment of the mixing head with the other mold part and if possible to cause the other mold part to assist in taking up some of the forces engendered during mixing and injection operations. For these reasons a bevel 123 is provided on the cantilevered free end of the bracket 120: this bevel is received in a matching notch on the mold when the mold closes and thus is temporarily secured and supported.

The present invention in its various embodiments provides significant advantages in the quality of mixing and in operational problems such as the random accumulation of formation of almost-solid particles in crevices within the device. These advantages are realized by a number of structural features that are common to all of the embodiments illustrated among FIGS. 1–6. These include having the principal jet-forming restriction—i.e. the minimum cross-sectional area of the liquid path comprising the respective series of passages 63,64 or 73,74; region or undercut 18 or 19; and ports 16,17 (and similarly in FIGS. 5,6)—directly in the wall of the mixing chamber where it feeds directly into the mixing chamber from the point of maximum restriction as shown by ports 16,17,116,216,217, and 316. Another difference compared with the prior art devices in particular, is that flow adjustments in the present device are achieved by adjusting the plunger stroke which in turn regulates the extent to which each port 16,17 . . . 316 is unblocked: prior art devices frequently use a needle valve or similar device upstream of the actually opening into the chamber. An advantage realized with the present structure is the ability to use lower liquid pressures (for the liquids to be mixed) than are used in prior art devices with which the inventor is familiar. The present structure also allows simultaneous adjustment of all liquids being fed by reason of the preferred port location and the stroke adjusting means. The preferred port location is to be substantially diametrally opposite to a port for the other liquid, e.g. 16 is opposite 17, 216 to 217, etc. Also, the manner in which the various liquids sweep into the ports from their passageways and then recirculate is such as to keep the ports washed during recirculation processes whereby to minimize the amount of solid particles that can collect in the critical areas of the various ports. The employment of on-off liquid flow valving for recirculation control and that is external to the mixing head (see Peter's patent, supra) but does not regulate flow area or volume is credited with this capability.

Different liquids or different mixing situations may require the use of different—and preferably interchangeable—sleeves and orifices. FIG. 2 shows the four port or orifice sleeve of FIGS. 1–4 with two ports 16,16,17,17 for each liquid. FIG. 5 on the other hand shows an interchangeable two orifices (216,217) sleeve 210 arranged to work in the same housing and environment as the embodiment of FIG. 2. The principal change in FIG. 5 is the sleeve itself which is undercut in the regions of the respective ports 215,217. The direction of flow of liquids through the housing preferably should be reversed so that liquids would enter by way of conduits 85 and 106 and exit or recirculate by passages 64,63,62,61 and 60 and by 74,73,72,71 and 70.

The invention claimed is:

1. Apparatus for mixing a plurality of liquids and discharging the resulting mixture into a mold runner or cavity downstream thereof comprising:

a housing having walls;

a mounting bore through said housing;

a sleeve secured in one end of said mounting bore providing a fluid-tight seal between first and second regions within and both at the same end of said mounting bore and having a mixing chamber bore defined therewithin, first and second ports communicating through said sleeve directly into said chamber, respectively, from said first and second regions;

first and second passageways, each for a fluid, through said housing walls into communication with said respective first and second regions;

an elongated plunger slidably fitted in said mixing chamber bore and peripherally engaging with a hydraulic fit the continuous walls of said mixing chamber;

a drive means for reciprocating said plunger supported on said housing and including therein a driving fluid chamber within said mounting bore substantially coaxial with said plunger axis, a drive piston reciprocably fitted therein and secured to one end of said plunger, and fluid port means for communicating to said driving fluid chamber to admit and remove driving fluid to at least one face of said piston, said piston being disposed between said mixing chamber and the hereafter said stroke adjusting means the three of which are substantially coaxial with said plunger; and stroke adjusting means mounted on said drive means for adjusting the stroke of said piston hence to adjust the stroke of said plunger and being adjustable over a range to position the other end of said plunger sufficiently prior to a mixing procedure to block said first and second ports and during mixing at least partially to unblock said first and second ports.

2. Apparatus according to claim 1, wherein said ports are rectangular and extend longitudinally substantially parallelly with the plunger axis.

3. Apparatus according to claim 1, wherein said first passageway includes a conduit system to conduct fluid into said first region and a conduit system to conduct fluid away from said first region whereby fluid may be recirculated into and then out of said first region.

4. Apparatus according to claim 1, wherein each of said first and second passageways includes a conduit system to conduct fluid into the region said passageway is connected to and a conduit system to conduct fluid away from such region whereby each fluid may be recirculated.

5. Apparatus according to claim 1, wherein said sleeve has respective first and second pluralities of said first and second ports, each port in each plurality being in full direct communication with its respective region.

6. Apparatus according to claim 5, wherein each of said first ports is substantially diametrally opposite one of said second ports.

7. Apparatus according to claim 1, wherein said first passageway includes a conduit system to conduct fluid into said first region and a conduit system to conduct fluid away from such first region whereby fluid may be recirculated and said sleeve has respective first and second pluralities of said first and second port with each port in each plurality being substantially diametrally opposite a port in the other plurality and being in full direct communication with its respective region.

8. Apparatus according to claim 1, wherein at least one of said passageways includes a conduit system to conduct fluid into the region said one passageway is connected to and a conduit system to conduct fluid away from such region whereby fluid may be recirculated, said first port being paired along a diameter with said second port whereby adjustment of the stroke of said plunger simultaneously adjusts the extent to which said first and second ports are unblocked.

9. Apparatus according to claim 1, for mixing liquids wherein said sleeve has a peripheral groove located on the sleeve inner diameter between the other end of said plunger and said sleeve and housing have through the walls of each and in series communication with each other an inlet passage and an outlet passage which both connect to said groove, to thereby establish a flow path suitable for solvent.

10. Apparatus according to claim 1, wherein said mounting bore is a substantially cylindrical opening, said sleeve has a substantially cylindrical outer shape to fit in said mounting bore which shape has first and second undercuts or relieved parts located to establish communication between, respectively, said first port and said first passageway and said second port and said second passageway.

11. Apparatus according to claim 1, wherein the maximum restriction in the liquid flow path that includes the series of said first passageway, said first region and said first port is located at said first port in the wall of said mixing chamber.

12. Apparatus according to claim 1 for mixing liquids wherein said mixing chamber has a peripheral groove located to be between the other end of said plunger and said piston; and said sleeve and housing have through the walls of each and in series communication with each other but not in communication with either said region an inlet passage and an outlet passage, to thereby establish a flow path comprising said inlet passage through said sleeve being connected between said inlet passage through said housing wall and said groove, and said outlet.

13. Apparatus for mixing a plurality of liquids and comprising:

a housing having walls;

a mixing chamber defined by bore walls and surrounded by the walls of said housing;

an elongated plunger slidably fitted in said mixing chamber and peripherally engaging with a hydraulic fit the walls of said mixing chamber;

a drive means for reciprocating said plunger supported on said housing and including therein a driving fluid chamber supported by the housing to be substantially coaxial with said plunger axis, a drive piston reciprocably fitted therein and secured to one end of said plunger, and fluid port means for communicating to said driving fluid chamber to admit and remove driving fluid to at least one face of said piston;

stroke adjusting means mounted on said drive means for adjusting the stroke of said piston hence to adjust the stroke of said plunger;

first and second ports opening directly into said mixing chamber from respective positions in said bore walls substantially opposite each other;

first and second passageways for fluid through the walls of said housing and connected, respectively, to said first and second ports;

said first passageway including a first conduit system to conduct fluid to said first port and a second conduit system to conduct fluid away from said first port whereby fluid may be recirculated;

said stroke adjusting means being adjustable to move said plunger sufficiently to block and to at least partially unblock said ports; and said piston being disposed between said mixing chamber and said adjusting means the three of which are substantially coaxial with said plunger.

14. Apparatus for mixing a plurality of liquids and comprising:

a housing having walls;

a mixing chamber surrounded by the walls of said housing;

a sleeve mounted within said housing and defining a bore by the internal walls therewithin, a portion of said bore being said mixing chamber;

an elongated plunger slidably fitted in said mixing chamber and peripherally engaging with a hydraulic fit the walls of said mixing chamber;

a drive means for reciprocating said plunger supported on said housing and including therein a driving fluid chamber supported by the housing to be substantially coaxial with said plunger axis, a drive piston reciprocably fitted therein and secured to one end of said plunger, and fluid port means for communicating to said driving fluid chamber to admit and remove driving fluid to at least one face of said piston;

stroke adjusting means mounted on said drive means for adjusting the stroke of said piston hence to adjust the stroke of said plunger;

first and second ports opening directly into said mixing chamber through the bore walls of said sleeve and from respective positions substantially opposite each other;

first and second passageways for fluid through the walls of said housing and connected, respectively, to said first and second ports;

said stroke adjusting means being adjustable to move said plunger sufficiently to block and to at least partially unblock said ports; and said piston being disposed between said mixing chamber and said adjusting means the three of which are substantially coaxial with said plunger.

15. Apparatus according to claim 14, for mixing liquids wherein said mixing chamber has a peripheral groove located to be between the other end of said plunger and said piston and said sleeve and housing have through the walls of each and in series communication with each other an inlet passage and an outlet passage, each said passage being connected at one end to said groove, to thereby establish a flow path comprising in series said inlet passage, said groove, and said outlet.

16. Apparatus according to claim 13 where said first port and second port respectively offer the maximum restriction in the liquid flow path that includes the series of said first passagewy and said first port and the series of said second passageway and said second port.

* * * * *